US012323214B2

(12) United States Patent
Park et al.

(10) Patent No.: US 12,323,214 B2
(45) Date of Patent: Jun. 3, 2025

(54) TRANSMISSION ANTENNA SELECTION METHOD AND ELECTRONIC DEVICE

(71) Applicant: SAMSUNG ELECTRONICS CO., LTD., Suwon-si (KR)

(72) Inventors: Sungchul Park, Suwon-si (KR); Boon Loong Ng, Mountain View, CA (US); Jianhua Mo, Mountain View, CA (US); Suha Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 17/738,902

(22) Filed: May 6, 2022

(65) Prior Publication Data

US 2022/0263562 A1 Aug. 18, 2022

Related U.S. Application Data

(63) Continuation of application No. PCT/KR2020/012423, filed on Sep. 15, 2020.

(30) Foreign Application Priority Data

Nov. 8, 2019 (KR) .......................... 10-2019-0142832

(51) Int. Cl.
*H04B 7/06* (2006.01)
*H04W 52/36* (2009.01)
(52) U.S. Cl.
CPC ......... *H04B 7/0691* (2013.01); *H04B 7/0608* (2013.01); *H04W 52/367* (2013.01)
(58) Field of Classification Search
CPC . H04W 52/346; H04W 52/42; H04W 52/367; H01Q 1/52; H04B 7/0608;
(Continued)

(56) References Cited

U.S. PATENT DOCUMENTS 9,900,894 B2 2/2018 Jung et al.
2002/0055345 A1 5/2002 Wood, Jr.
(Continued)

FOREIGN PATENT DOCUMENTS

JP 2018-29313 2/2018
KR 10-2013-0010120 1/2013
(Continued)

OTHER PUBLICATIONS

Korean Office Action issued Aug. 2, 2023 in corresponding Korean Patent Application No. 10-2019-0142832.
(Continued)

*Primary Examiner* — Mahran Y Abu Roumi
(74) *Attorney, Agent, or Firm* — Nixon & Vanderhye P.C.

(57) ABSTRACT

In a method for operating an electronic device according to various embodiments: signal transmission in a first frequency band and signal transmission in a second frequency band are determined whether to be performed simultaneously by a first selected antenna selected from a plurality of first antennas configured to transmit a signal in the first frequency band and a second selected antenna selected from a plurality of second antennas configured to transmit a signal in the second frequency band, respectively; based on the signal transmission in the first frequency band and the signal transmission in the second frequency band being determined to be performed simultaneously, the first selected antenna and/or the second selected antenna are decided based on a look-up table created in accordance with the placements of the plurality of first antennas and the plurality of second antennas in the electronic device; and a signal is transmitted in the first frequency band by the first selected antenna, and a signal is transmitted in the second frequency band by the second selected antenna.

13 Claims, 9 Drawing Sheets

(58) Field of Classification Search
CPC .......... H04B 1/04; H04B 1/00; H04B 17/318; H04B 1/401; H04B 7/0691
See application file for complete search history.

(56) References Cited

U.S. PATENT DOCUMENTS

| | | | |
|---|---|---|---|
| 2011/0250928 | A1 | 10/2011 | Schlub et al. |
| 2012/0021707 | A1* | 1/2012 | Forrester ............... H04W 52/30 455/115.3 |
| 2012/0106613 | A1* | 5/2012 | Piazza ................. H01Q 9/0407 375/227 |
| 2014/0141791 | A1 | 5/2014 | Razavi et al. |
| 2017/0093457 | A1* | 3/2017 | Jain ........................ H04B 15/00 |
| 2019/0053236 | A1 | 2/2019 | Jung et al. |
| 2024/0055754 | A1* | 2/2024 | Ikemoto ................... H01Q 1/38 |
| 2024/0098652 | A1* | 3/2024 | Chien ............... H04W 28/0958 |

FOREIGN PATENT DOCUMENTS

| | | | |
|---|---|---|---|
| KR | 10-2017-0038660 | 4/2017 | |
| WO | WO-2018004918 A1 * | 1/2018 | ............. H01Q 1/242 |

OTHER PUBLICATIONS

International Search Report for PCT/KR2020/012423 dated Jan. 12, 2021, 4 pages.
Written Opinion of the ISA for PCT/KR2020/012423 dated Jan. 12, 2021, 9 pages.
Kranjec, et al., "Non-contact heart rate and heart rate variability measurements: A review", Biomedical Signal Processing and Control, vol. 13, Mar. 20, 2014, pp. 102-112.
Notice of Patent Grant dated Sep. 27, 2024 for KR10-2019-0142832.

* cited by examiner

TRANSMISSION ANTENNA SELECTION METHOD AND ELECTRONIC DEVICE

CROSS-REFERENCE TO RELATED APPLICATIONS

This application is a continuation of International Application No. PCT/KR2020/012423 designating the United States, filed on Sep. 15, 2020, in the Korean Intellectual Property Receiving Office and claiming priority to Korean Patent Application No. 10-2019-0142832, filed on Nov. 8, 2019, in the Korean Intellectual Property Office, the disclosures of which are incorporated by reference herein in their entireties.

BACKGROUND

Field

The disclosure relates to an apparatus and method for operating a transmission antenna in an electronic device having a plurality of antennas.

Description of Related Art

To meet the increasing traffic demand after commercialization of a 4th-generation (4G) communication system, an improved 5th-generation (5G) communication system or pre-5G communication system (hereinafter, referred to as '5G communication system') is being developed. The 5G communication system is called a beyond 4G network communication system or a post long term evolution (post LTE) system.

To achieve a high data rate, the 5G communication system was implemented in a very high frequency (mmWave) band (for example, 6 GHz to 200 GHz band). In general, in order to provide a smooth wireless communication service in a very high frequency band, it is necessary to decrease a path loss of radio waves and increase a propagation distance of the radio waves. For this reason, in the 5G communication system, beamforming, massive MIMO, full dimensional MIMO (FD-MIMO), array antenna, analog beamforming, and large scale antenna technologies, etc. were applied.

An electronic device supporting a 5G communication system can include a plurality of antennas supporting various frequency bands. In the electronic device, each of the frequency bands can be allocated for a wireless communication scheme that is based on a unique specification (spec). For example, the electronic device can include one or a plurality of antennas supporting a frequency band for each of the wireless communication schemes. For example, the electronic device can include one or a plurality of antennas supporting a frequency band of 6 GHz or less, a plurality of antennas supporting a frequency band of 6 GHz or more, and at least one antenna supporting an unlicensed band of 2.4 GHz or 5 GHz.

When intending to operate a specific wireless communication scheme, the electronic device can select one or a plurality of antennas supporting a frequency band allocated for the specific wireless communication scheme. Accordingly, when intending to operate different wireless communication schemes (hereinafter, referred to as 'heterogeneous wireless communication schemes'), the electronic device can select one or a plurality of antennas for each frequency band allocated to each of the heterogeneous wireless communication schemes. The electronic device can transmit a signal through the one or plurality of antennas selected for each frequency.

For example, the electronic device can transmit a signal of a first frequency band through at least one first antenna selected for the first frequency band, and transmit a signal of a second frequency band through at least one second antenna selected for the second frequency band. The signal transmitted through the first antenna can become an interference component to an electronic device that intends to receive the signal transmitted through the second antenna. Inversely, the signal transmitted through the second antenna can become an interference component to an electronic device that intends to receive the signal transmitted through the first antenna. The interference component can be a factor of degrading a signal quality in the electronic device. The degraded signal quality can be improved by increasing a transmission power of a corresponding signal, but this can increase power consumption.

SUMMARY

Embodiments of the disclosure provide an apparatus and method for operating a transmission antenna for each heterogeneous wireless communication scheme in an electronic device supporting the heterogeneous wireless communication scheme using a plurality of antennas.

Embodiments of the disclosure provide an apparatus and method for, when intending to transmit signals from all antennas being in a radiation concentration region, using an antenna of another region for transmission of some signals.

The problems addressed by various embodiments of the present disclosure are not limited by the above mentioned problems, and other technical problems not mentioned would be clearly understood to those having an ordinary skill in the art to which the present disclosure belongs from the description below.

According to various example embodiments of the present disclosure, an electronic device may include: a plurality of first antennas configured to transmit a signal of a first frequency band, a plurality of second antennas configured to transmit a signal of a second frequency band, at least one processor, and a memory operatively connected to the at least one processor and storing a look-up table including a plurality of antenna combinations. The memory may store an instruction which, when executed, cause the at least one processor to: based on signal transmission in the first frequency band and the second frequency band being requested, select one antenna combination among the plurality of antenna combinations included in the look-up table based on the first frequency band and the second frequency band, and control the electronic device to transmit a signal of the first frequency band through a first selected antenna included in the selected antenna combination, and transmit a signal of the second frequency band through a second selected antenna included in the selected antenna combination. The first selected antenna may be one of the plurality of first antennas, the second selected antenna may be one of the plurality of second antennas, and the plurality of antenna combinations may be combinations of a first antenna and a second antenna determined based on the arrangement of the plurality of first antennas and the plurality of second antennas in the electronic device.

According to various example embodiments of the present disclosure, an electronic device may include: at least one memory, one or a plurality of first antennas configured to transmit a signal of a first frequency band, a plurality of second antennas configured to transmit a signal of a second frequency band, and at least one processor operatively coupled to the at least one memory and configured to: control the one or plurality of first antennas and the plurality of second antennas. The at least one memory may store an instruction which, when executed, causes the at least one processor to: select a new antenna combination to replace a current antenna combination from a look-up table including antenna combinations which are determined based on a radiation energy concentration region which may be provided by a radiation region of a signal transmitted in the first frequency band and a radiation region of a signal transmitted in the second frequency band. A first antenna included in the current antenna combination and a first antenna included in the new antenna combination may be the same, and a second antenna included in the current antenna combination and a second antenna included in the new antenna combination may be different.

According to various example embodiments of the present disclosure, a method of operating an electronic device may include: determining whether signal transmission in a first frequency band through a first selected antenna selected from a plurality of first antennas configured to transmit a signal of the first frequency band and signal transmission in a second frequency band through a second selected antenna selected from a plurality of second antennas configured to transmit a signal of the second frequency band are to be performed simultaneously, and based on the signal transmission in the first frequency band and the signal transmission in the second frequency band determined to be performed simultaneously, determining at least one of the first selected antenna or the second selected antenna using a look-up table created based on the arrangement of the plurality of first antennas and the plurality of second antennas in the electronic device, and transmitting the signal of the first frequency band through the first selected antenna, and transmitting the signal of the second frequency band through the second selected antenna.

According to various example embodiments of the present disclosure, a method of operating an electronic device may include: selecting a new antenna combination to replace a current antenna combination from a look-up table including antenna combinations which are determined based on a radiation energy concentration region which may be provided by a radiation region of a signal transmitted in the first frequency band and a radiation region of a signal transmitted in the second frequency band, transmitting the signal of the first frequency band through at least one first antenna included in the selected new antenna combination, and transmitting the signal of the second frequency band through at least one second antenna included in the selected new antenna combination. A first antenna included in the current antenna combination and a first antenna included in the new antenna combination may be the same, and a second antenna included in the current antenna combination and a second antenna included in the new antenna combination may be different.

According to various example embodiments of the present disclosure, it is possible to minimize and/or reduce a mutual interference of a signal transmitted through one or a plurality of antennas for each heterogeneous wireless communication scheme in an electronic device.

Effects obtainable in various embodiments of the present disclosure are not limited to the above-mentioned effects, and other effects not mentioned would be clearly understood to those having an ordinary skill in the art to which various embodiments of the present disclosure pertain from the description below.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
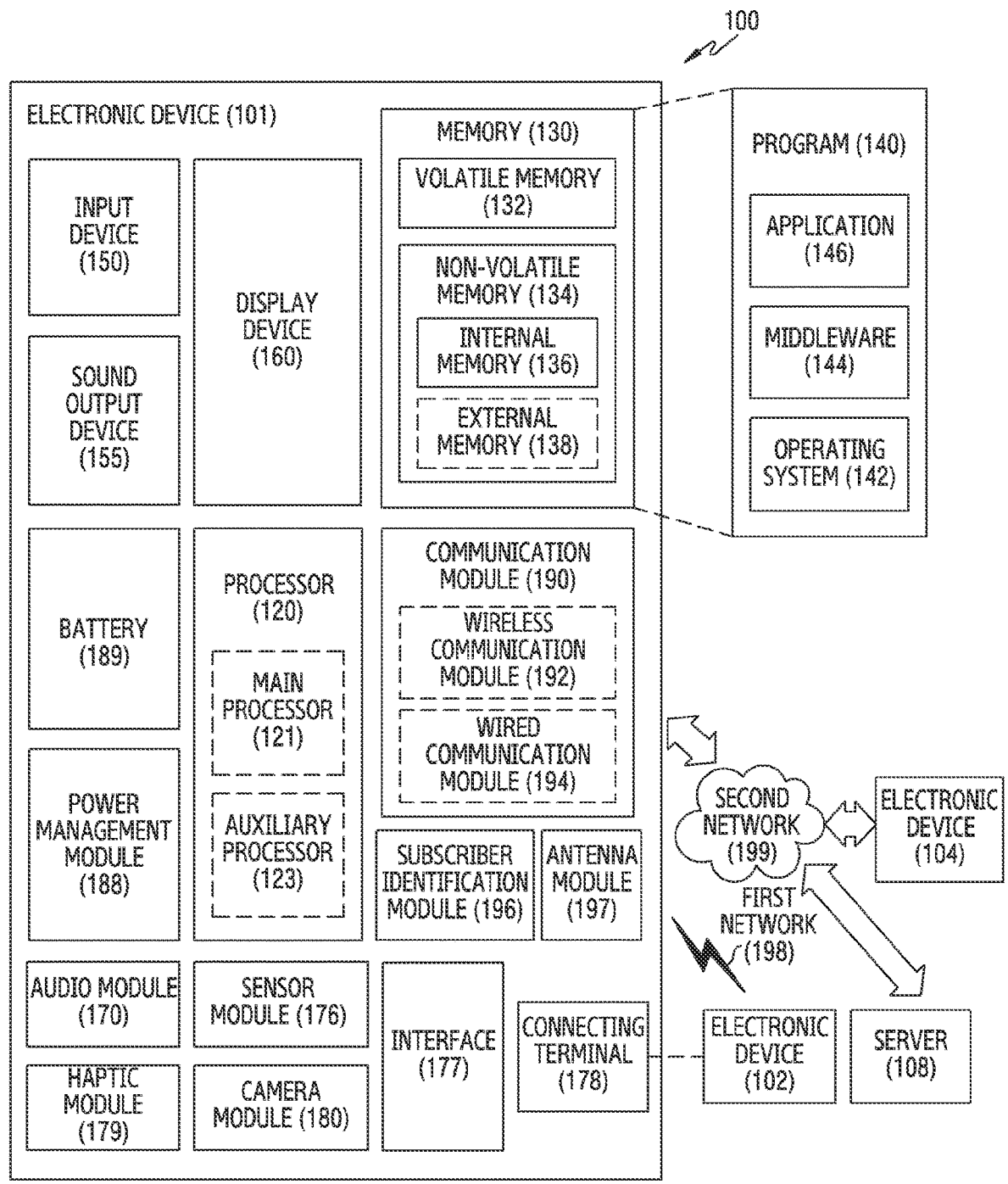
FIG. 1 is a block diagram illustrating an example electronic device in a network environment according to various embodiments.

Hereinafter, various example embodiments are described in greater detail with reference to the accompanying drawings. However, in the drawings, the size of the components may be exaggerated or reduced for description convenience's sake. For example, the size and thickness of each component shown in the drawings are arbitrarily indicated for convenience of description, and the present disclosure is not necessarily limited to the illustrated embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
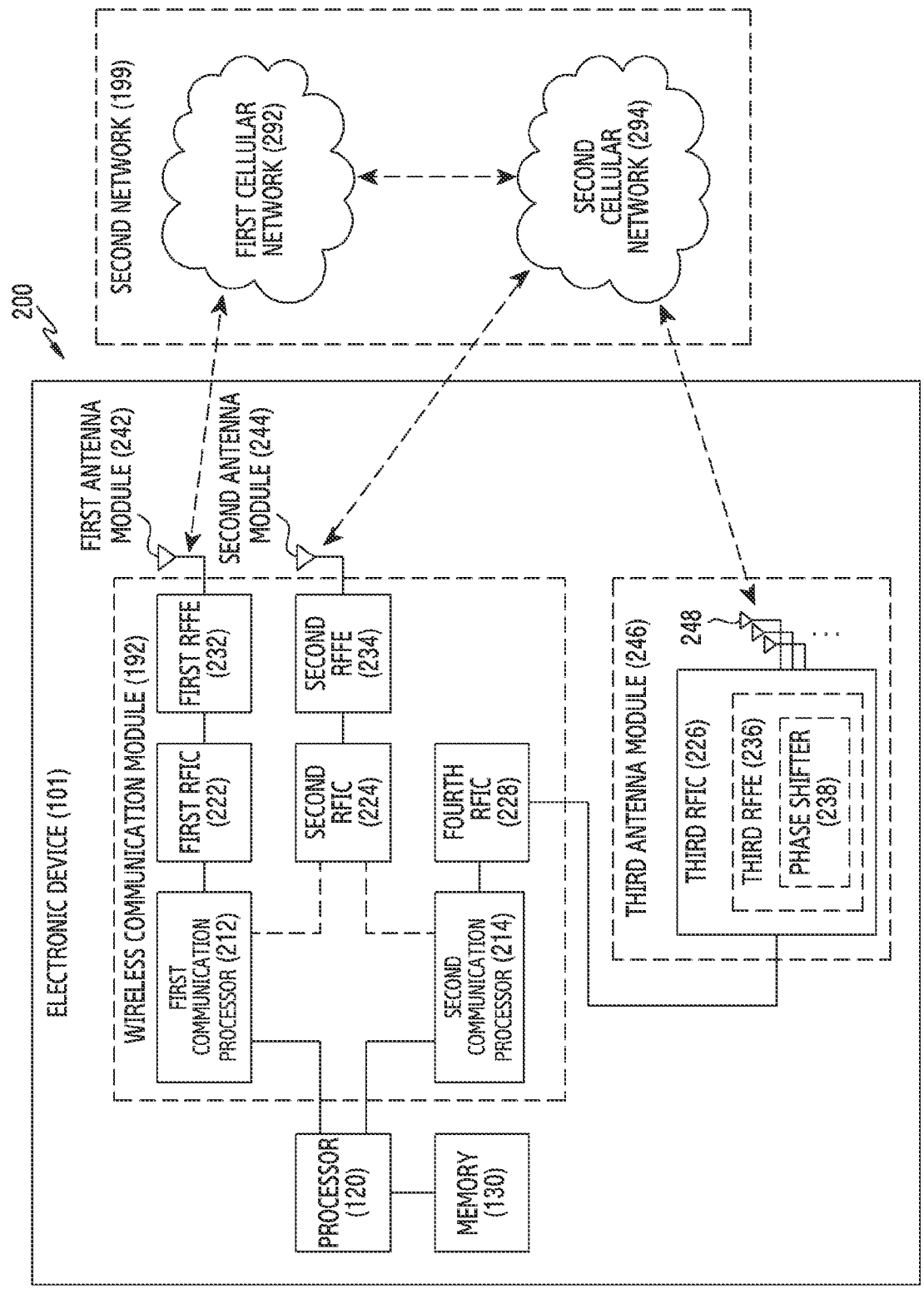
FIG. 2 is a block diagram illustrating an example configuration of an electronic device supporting a plurality of frequency bands according to various embodiments.

FIG. 2 is a block diagram 200 illustrating an example configuration of an electronic device supporting a plurality of frequency bands according to various embodiments.

Referring to FIG. 2, the electronic device 101 may include a first communication processor (e.g., including processing circuitry) 212, a second communication processor (e.g., including processing circuitry) 214, a first RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor (e.g., including processing circuitry) 120 and a memory 130. The second network 199 may include a first cellular network 292 and a second cellular network 294. According to an embodiment, the electronic device 101 may further include at least one component among the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to an embodiment, the fourth RFIC 228 may be omitted or may be included as a part of the third RFIC 226.

The first communication processor 212 may include various processing circuitry and support the establishment of a communication channel of a band to be used for a wireless communication with the first cellular network 292, and support a legacy network communication through the established communication channel. According to various embodiments, the first cellular network 292 may be a legacy network including a second-generation (2G), 3G, 4G, or long term evolution (LTE) network. The second communication processor 214 may include various processing circuitry and support the establishment of a communication channel corresponding to a specified band (e.g., about 6 GHz to about 60 GHz) among bands to be used for a wireless communication with the second cellular network 294, and support a 5G network communication through the established communication channel. According to various embodiments, the second cellular network 294 may be a 5G network defined by 3GPP. Additionally, according to an embodiment, the first communication processor 212 or the second communication processor 214 may support the establishment of a communication channel corresponding to another specified band (e.g., about 6 GHz or less) among bands to be used for a wireless communication with the second cellular network 294, and support a 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package, with the processor 120, the auxiliary processor 123, or the communication module 190. According to an embodiment, the first communication processor 212 and the second communication processor 214 may be directly or indirectly connected to each other by an interface (not shown), and present and receive data or a control signal in either direction or both directions.

At transmission, the first RFIC 222 may convert a baseband signal provided by the first communication processor 212 into a radio frequency (RF) signal of about 700 MHz to about 3 GHz used for the first cellular network 292 (e.g., the legacy network). At reception, an RF signal may be acquired from the first cellular network 292 (e.g., the legacy network) via an antenna (e.g., the first antenna module 242), and be preprocessed through an RFFE (e.g., the first RFFE 232). The first RFIC 222 may convert the preprocessed RF signal into a baseband signal wherein it may be processed by the first communication processor 212.

At transmission, the second RFIC 224 may convert a baseband signal provided by the first communication processor 212 or the second communication processor 214 into an RF signal (hereinafter, a 5G Sub6 RF signal) of a Sub6 band (e.g., about 6 GHz or less) used for the second cellular network 294 (e.g., the 5G network). At reception, a 5G Sub6 RF signal may be acquired from the second cellular network 294 (e.g., the 5G network) via an antenna (e.g., the second antenna module 244), and be preprocessed through an RFFE (e.g., the second RFFE 234). The second RFIC 224 may convert the preprocessed 5G Sub6 RF signal into a baseband signal wherein it may be processed by a corresponding one of the first communication processor 212 or the second communication processor 214.

The third RFIC 226 may convert a baseband signal provided by the second communication processor 214 into an RF signal (hereinafter, referred to as a 5G Above6 RF signal) of a 5G Above6 band (e.g., about 6 GHz to about 60 GHz) to be used for the second cellular network 294 (e.g., the 5G network). At reception, a 5G Above6 RF signal may be acquired from the second cellular network 294 (e.g., the 5G network) via an antenna (e.g., the antenna 248) and be preprocessed through the third RFFE 236. The third RFIC 226 may convert the preprocessed 5G Above6 RF signal into a baseband signal wherein it may be processed by the second communication processor 214. According to an embodiment, the third RFFE 236 may be formed as a part of the third RFIC 226.

According to an embodiment, the electronic device 101 may include the fourth RFIC 228 separately from, or as at least a part of, the third RFIC 226. In this case, the fourth RFIC 228 may convert a baseband signal provided by the second communication processor 214 into an RF signal (hereinafter, an IF signal) of an intermediate frequency band (e.g., about 9 GHz to about 11 GHz) and then, forward the IF signal to the third RFIC 226. The third RFIC 226 may convert the IF signal into a 5G Above6 RF signal. At reception, a 5G Above6 RF signal may be received from the second cellular network 294 (e.g., the 5G network) via an antenna (e.g., the antenna 248) and be converted to an IF signal by the third RFIC 226. The fourth RFIC 228 may convert the IF signal into a baseband signal wherein it may be processed by the second communication processor 214.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one antenna module of the first antenna module 242 or the second antenna module 244 may be omitted or be combined with another antenna module and process RF signals of a plurality of corresponding bands.

According to an embodiment, the third RFIC 226 and the antenna 248 may be disposed on the same substrate to form the third antenna module 246. For example, the wireless communication module 192 or the processor 120 may be disposed on a first substrate (e.g., a main PCB). In this case, the third RFIC 226 is disposed in a partial area (e.g., a lower surface) of a second substrate (e.g., a sub PCB) separate from the first substrate, and the antenna 248 is disposed in another partial region (e.g., an upper surface), whereby the third antenna module 246 may be formed. By disposing the third RFIC 226 and the antenna 248 on the same substrate, it is possible to decrease a length of a transmission line therebetween. This, for example, may reduce that a signal of a high-frequency band (e.g., about 6 GHz to about 60 GHz) used for 50 network communication is lost (e.g., attenuated) due to the transmission line. Owing to this, the electronic device 101 may improve a quality or speed of communication with the second cellular network 294 (e.g., the 50 network).

According to an embodiment, the antenna 248 may be formed as an antenna array including a plurality of antenna elements available for beamforming. In this case, the third RFIC 226 may, for example, include a plurality of phase shifters 238 corresponding to the plurality of antenna elements as a part of the third RFFE 236. At transmission, each of the plurality of phase shifters 238 may convert a phase of a 5G Above6 RF signal to be transmitted to the outside (e.g., a base station of the 5G network) of the electronic device 101 through a corresponding antenna element. At reception, each of the plurality of phase shifters 238 may convert a phase of a 5G Above6 RF signal received from the outside through a corresponding antenna element into the same or substantially same phase. This enables transmission or reception through beamforming between the electronic device 101 and the outside.

The second cellular network 294 (e.g., the 5G network) may be operated independently (e.g., stand-alone (SA)) from, or be operated in connection (e.g., non-stand alone (NSA)) with, the first cellular network 292 (e.g., the legacy network). For example, the 5G network may have only an access network (e.g., a 5G radio access network (RAN) or a next generation RAN (NG RAN)), and may not have a core network (e.g., a next generation core (NGC)). In this case, after accessing the access network of the 50 network, the electronic device 101 may access an external network (e.g., the Internet) under the control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 230, and may be accessed by other components (e.g., the processor 120, the first communication processor 212, or the second communication processor 214).

According to various embodiments, the processor 120 of the electronic device 101 may include various processing circuitry and execute one or more instructions stored in the memory 130. The processor 120 may include at least one of a circuit for processing data, for example, and without limitation, an integrated circuit (IC), an arithmetic logic unit (ALU), a field programmable gate array (FPGA), and a large scale integration (LSI). The memory 130 may store data related to the electronic device 101. The memory 130 may include a volatile memory such as a random access memory (RAM) including a static random access memory (SRAM) or a dynamic RAM (DRAM), etc., or may include a non-volatile memory such as not only a read only memory (ROM), a magneto-resistive RAM (MRAM), a spin-transfer torque MRAM (STT-MRAM), a phase-change RAM (PRAM), a resistive RAM (RRAM), and/or a ferroelectric RAM (FeRAM) but also a flash memory, an embedded multimedia card (eMMC), a solid state drive (SSD), etc.

According to various embodiments, the memory 130 may store an instruction related with an application and an instruction related with an operating system (OS). The operating system is system software executed by the processor 120. By executing the operating system, the processor 120 may manage hardware components included in the electronic device 101. The operating system may present an application programming interface (API) as an application that is software other than the system software.

According to various embodiments, one or more applications that are a set of a plurality of instructions may be installed in the memory 130. That the application is installed in the memory 130 may refer, for example, to the application being stored in a format of being executable by the processor 120 connected to the memory 130.

The following various example embodiments assume antennas supporting three frequency bands for convenience of description. However, it will be understood that various embodiments disclosed for antennas supporting four or more frequency bands may be identically or similarly applied to the extent of simple design change.

Figure 3:
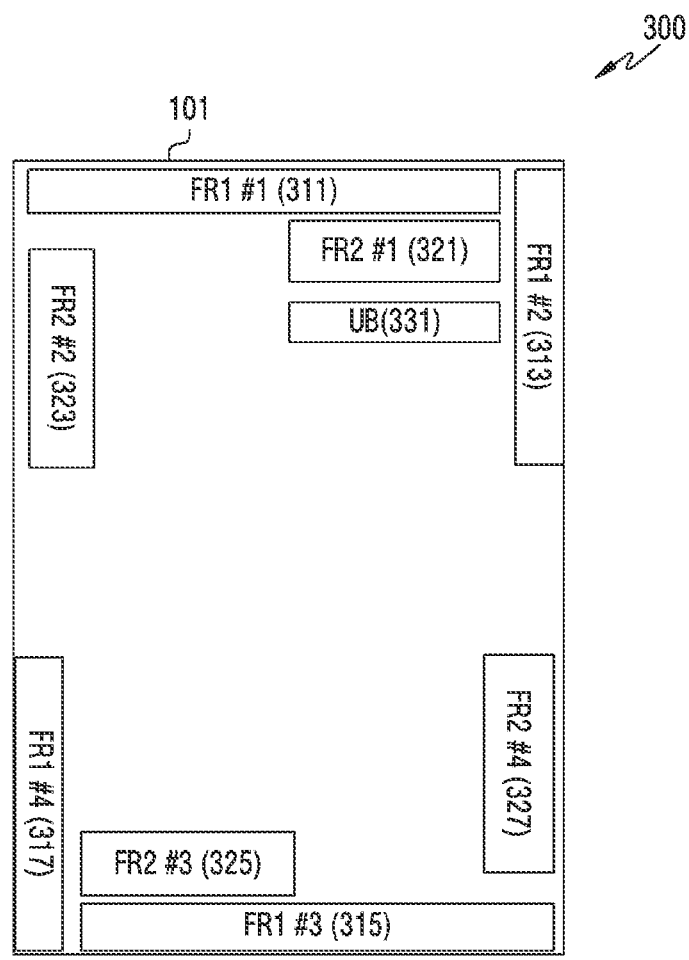
FIG. 3 is a diagram illustrating an example of an antenna arrangement in an electronic device according to various embodiments.

FIG. 3 is a diagram 300 illustrating an example of antenna arrangement in the electronic device 101 according to various embodiments. In an embodiment, the electronic device 101 of FIG. 3 may correspond to the electronic device 101 of FIG. 1 or FIG. 2.

Referring to FIG. 3, in an embodiment, the electronic device 101 may include antennas capable of supporting a plurality of, e.g., three, frequency bands. For example, the electronic device 101 may include antennas (FR1 #1, FR1 #2, FR1 #3, and FR1 #4) 311, 313, 315, and 317 (e.g., the first antenna module 242 of FIG. 2 or the second antenna module 244 of FIG. 2) capable of supporting a first frequency band (frequency range 1 (FR1)), antennas (FR2 #1, FR2 #2, FR2 #3, and FR2 #4) 321, 323, 325, and 327 (e.g., the antenna 248 of FIG. 2) capable of supporting a second frequency band (FR2), and/or an antenna (UB antenna) 331 supporting an unlicensed band (UB).

In an embodiment, the first frequency band may refer to a frequency band of 6 GHz or less that is available for all LTE and 5G communication, and the second frequency band may refer to a frequency band of 6 GHz or more that is available only for 5G communication, and the non-licensed band may refer to a frequency band (e.g., 2.4 GHz, 5 GHz, and 60 GHz bands) that is available for short-range wireless communication (e.g., WIFI, Bluetooth communication). In an embodiment, each of the antennas 321, 323, 325, and 327 capable of supporting the second frequency band may be implemented as an mmWave antenna module. For example, the FR2 #1 (321) may be an antenna module which includes a plurality of antennas (e.g., antenna elements) supporting a frequency band of 6 GHz or more and forming a directional beam.

In an embodiment, some of the antennas 311, 313, 315, and 317 capable of supporting the first frequency band (e.g., the FR1 #1 (311)) may be used only as a reception antenna for multiple-input and multiple-output (MIMO) or diversity as well. However, the frequency band supported by this each antenna, the number of antennas, and antenna arrangement are not limited by the embodiment of FIG. 3, and other constructions and other arrangement may be also possible.

Figure 4:
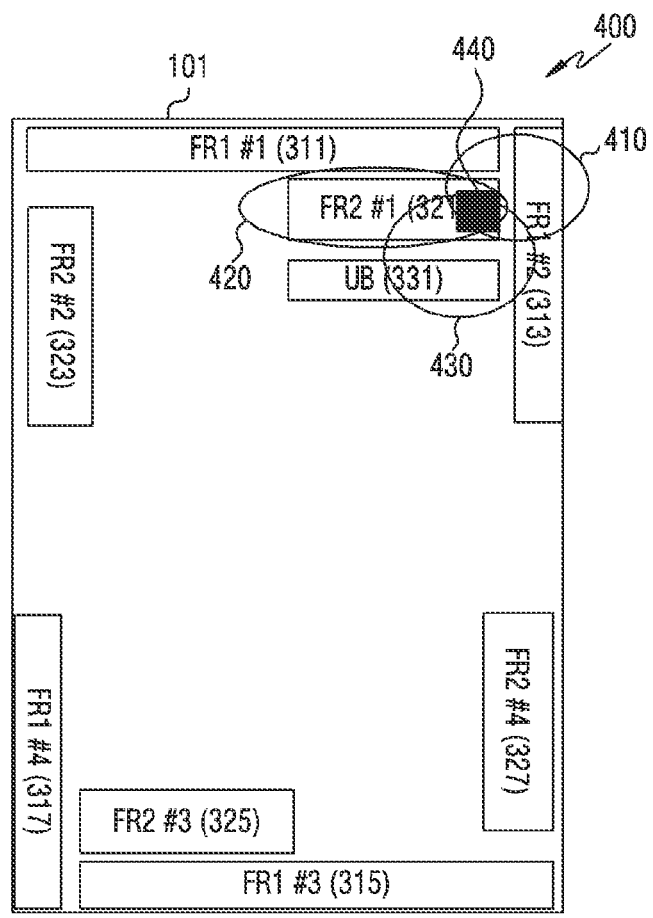
FIG. 4 is a diagram illustrating an example of a signal form radiated by antennas in an electronic device according to various embodiments.

FIG. 4 is a diagram 400 illustrating an example of a signal form radiated by antennas in the electronic device 101 according to various embodiments. In an embodiment, the electronic device 101 of FIG. 4 may correspond to the electronic device 101 of FIG. 1 or FIG. 2.

Referring to FIG. 4, in an embodiment, when the FR1 #2 (313) is selected to transmit a signal of a first frequency band, the FR2 #1 (321) is selected to transmit a signal of a second frequency band, and the UB antenna 331 is also selected to transmit a signal, an overlapped region 440 of radiation regions 410, 420, and 430 where intensities of the signals transmitted by the respective selected antennas are strong may be formed. Hereinafter, the overlapped region 440 of the radiation regions where the intensities of the signals transmitted by the respective plurality of antennas are strong may be referred to, for example, as a 'radiation energy concentration region'.

The radiation energy concentration region 440 capable of being formed for the above-described reasons may not satisfy regulations required by the Federal Communications Commission (FCC), etc. For example, the FCC, etc. are proposing regulations on specific absorption rate (SAR), maximum permissible exposure (MPE), etc., in order to prevent and/or reduce radio waves (e.g., radio signals) provided by electronic devices from damaging the human body or property. When the regulations on the radio waves provided by the electronic devices are not proposed, radio waves provided by specific electronic devices may have a negative effect on the human body.

Equation 1 below shows an example of a radio protocol (total exposure ratio, TER) related to a strength of a radio signal.

$$\sum_{i=100kHz}^{6GHz} \frac{SAR_i}{SAR_{limit}} + \sum_{i>6GHz}^{300GHz} \frac{PD_i}{PD_{limit}} \leq 1 \qquad \text{[Equation 1]}$$

Here, the $SAR_i$ represents a SAR value (unit:mW/g) measured for a transmitter (i) in a frequency band of 100 KHz to 6 GHz, the $SAR_{limit}$ represents a SAR-related regulatory value fixed for the entire band, and the $PD_i$ is a power density (unit: W/m2) measured for the transmitter (i) in a frequency band of 6 GHz to 300 GHz, and the $PD_{limit}$ is a regulatory value for a power density.

In the radiation energy concentration region 440 illustrated in FIG. 4, all of transmission signals of each of the antennas are received and the $SAR_i$ and $PD_i$ are increased, and thus a value $$\left( \sum_{i=100kHz}^{6GHz} \frac{SAR_i}{SAR_{limit}} + \sum_{i>6GHz}^{300GHz} \frac{PD_i}{PD_{limit}} \right)$$

determined when Equation 1 is applied may be greater than 1. For example, in the radiation energy concentration region 440, a situation of violating the TER may occur.

Figure 5:
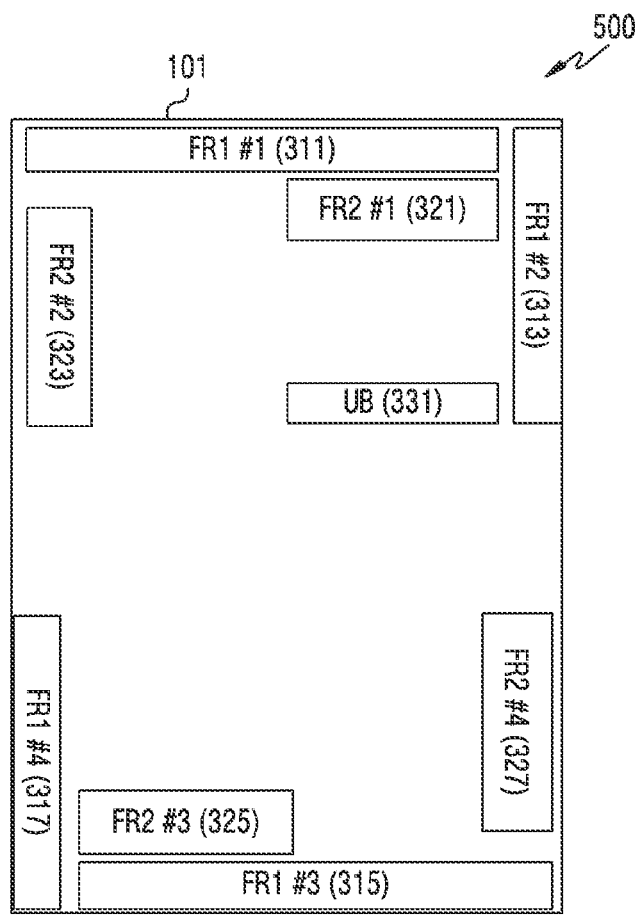
FIG. 5 is a diagram illustrating an example of changing the arrangement of antennas in an electronic device according to various embodiments.

FIG. 5 is a diagram 500 illustrating an example of changing the arrangement of antennas in the electronic device 101 according to various embodiments. In an embodiment, the electronic device 101 of FIG. 5 may correspond to the electronic device 101 of FIG. 1 or FIG. 2. Also, it should be noted that the use and arrangement of some of the antennas shown in FIG. 5 have been changed based on the use and arrangement of the antennas shown in FIG. 3.

Referring to FIG. 5, in an embodiment, some antennas (e.g., the FR1 #2 (313)) capable of creating a radiation energy concentration region among the antennas (FR1 #1, FR1 #2, FR1 #3, and FR1 #4) 311, 313, 315, and 317 (e.g., the first antenna module 242 of FIG. 2 or the second antenna module 244 of FIG. 2) capable of supporting a first frequency band may be changed to be used only as reception antennas for MIMO or diversity, and the USB antenna 331 supporting the unlicensed band may be changed and positioned downward wherein the distance is greater than or is equal to a preset threshold value.

According to an embodiment, when the electronic device simultaneously transmits, or is required to transmit, signals through at least two or more antennas disposed adjacent to each other, the electronic device may reselect at least one of the at least two or more antennas by another antenna or may adjust a transmission power of at least one of the at least two or more antennas, wherein it may satisfy regulation required for a radiation energy concentration region. It may be assumed that the at least two or more adjacently disposed antennas support different frequency bands. The at least two or more adjacently disposed antennas may include, for example, at least one antenna supporting a first frequency band and at least one antenna supporting a second frequency band. In addition, when there are three or more frequency bands intending to transmit signals, the adjacently disposed antennas may include at least one antenna supporting each of the three or more frequency bands.

According to an embodiment, a case in which signal transmission is simultaneously requested through at least two or more antennas may correspond to a situation in which, while a signal is transmitted in one frequency band through one or a plurality of antennas, signal transmission in another frequency band is requested.

When a position of an antenna is changed according to an embodiment of FIG. 5, even if the FR2 #1 (321) transmits a signal of a second frequency band and the UB antenna 331 simultaneously transmits an unlicensed band signal, the provision of the radiation energy concentration region may be prevented and/or reduced. However, since there are spatial and performance limitations in positioning the antenna because of the size of the electronic device, it may not be possible in many cases to respond by changing the position of the antenna as shown in FIG. 5.

Accordingly, various embodiments of the present disclosure propose a way of operating a plurality of antennas wherein an electronic device operating the plurality of antennas arranged in a predetermined (e.g., specified) pattern may satisfy regulations required for a radiation energy concentration region. According to an embodiment, when it is required to simultaneously transmit signals in at least two or more frequency bands, the electronic device may select at least two or more antennas to transmit the signals, using a look-up table. In the look-up table, for example, one or a plurality of antenna combinations selectable for each combination of frequency bands to transmit signals may be recorded. The look-up table may be basically created and stored in the electronic device 101 by an experimental value taking into consideration a distance at which antennas are disposed on a PCB during product production, for example.

Table 1 below illustrates, for example, an example of a look-up table capable of being stored based on the arrangement of antennas shown in FIG. 4.

TABLE 1

| Condition FR2 ANT in action | FR1 ANT combination candidate |
|---|---|
| FR2 #1 (321) | FR1 #3 (315) or FR1 #4 (317) |
| FR2 #2 (323) | FR1 #2 (313), FR1 #3 (315) or FR1 #4 (317) |
| FR2 #3 (325) | FR1 #1 (311) or FR1 #2 (313) |
| FR2 #4 (327) | FR1 #1 (311), FR1 #2 (313) or FR1 #1 (317) |

The look-up table illustrated in <Table 1> may be stored in the electronic device 101 in which the electronic device 101 supports communication in first and second frequency bands, and it is created assuming that the antenna FR2 supporting the second frequency band is fixed and the antenna FR1 supporting the first frequency band is switched. As another example, the look-up table may be created assuming that the antenna FR1 supporting the first frequency band is fixed and the antenna FR2 supporting the second frequency band is switched as well. According to an embodiment, the look-up table stored in the electronic device 101 may be created in developer's consideration of information such as a distance (separated distance) between antennas disposed on a PCB, a radiation direction of each antenna, and a radiation region dependent on the distance. The look-up table may be created by a developer based on the experimental value may be stored in the memory included in the electronic device 101. Assuming Table 1 above, when the electronic device 101 intends to select, or change by, an antenna for the second frequency band in a situation of using the FR2 #1 (321) for the first frequency band, the electronic device 101 may select one of the FR1 #3 (315) or the FR1 #4 (317). In this case, a selected antenna combination may be one of 'FR2 #1 (321) and FR1 #3 (315)' or 'FR2 #1 (321) and FR1 #4 (317)'.

As another example, when the electronic device 101 intends to select, or change by, the antenna for the second frequency band in a situation of using the FR2 #4 (327) for the first frequency band, the electronic device may select one of the FR1 #1 (311), the FR1 #2 (313), or the FR1 #4 (317). In this case, a selected antenna combination may be one of 'FR2 #4 (327) and FR1 #1 (311)', 'FR2 #4 (327) and FR1 #2 (313)', or 'FR2 #4 (327) and FR1 #4 (317)'.

As an example, a look-up table may be created based on a distance between antennas disposed on a PCB, and the created look-up table may be stored in a memory of the electronic device 101 as well. In this case, when selecting an antenna combination, the electronic device 101 may be also implemented to select one antenna (e.g., the first antenna FR1 supporting the first frequency band) and, with reference to the look-up table, select another antenna (e.g., the second antenna FR2 supporting the second frequency band) disposed at a distance from the selected first antenna FR1 to the extent that a radiation energy region is not provided. In this case, whenever a selection of an antenna combination is requested, the electronic device 101 needs to be able to determine whether the radiation energy concentration region is provided based on a distance between antennas recorded in the look-up table.

In various example embodiments, to select an antenna combination wherein a radiation energy concentration region is not provided, it may be desirable to create a look-up table by selectable antenna combinations and store the look-up table in the memory of the electronic device 101.

In the above-described example, it is assumed that the electronic device 101 supports only two frequency bands, however, this is merely an example, and even if more frequency bands are supported, the look-up table may be created in the same or similar method, and the created look-up table may be stored in the memory.

According to an embodiment, the electronic device 101 may select an antenna combination to be used among antenna combinations registered to the look-up table based on at least two or more frequency bands, and transmit signals in the at least two or more frequency bands through each of at least two or more antennas belonging to the selected antenna combination.

According to an embodiment, the antennas belonging to the selected antenna combination may include at least two or more antennas supporting different frequency bands. The antennas belonging to the selected antenna combination may include one or a plurality of antennas supporting the same frequency band. The antennas belonging to the selected antenna combination may include, for example, at least one antenna supporting the first frequency band and at least one antenna supporting the second frequency band. The first frequency band and the second frequency band may need to be different from each other. Also, when there are three or more frequency bands intending to transmit signals, the antennas belonging to the selected antenna combination may include at least one antenna supporting each of the three or more frequency bands.

Figure 6:
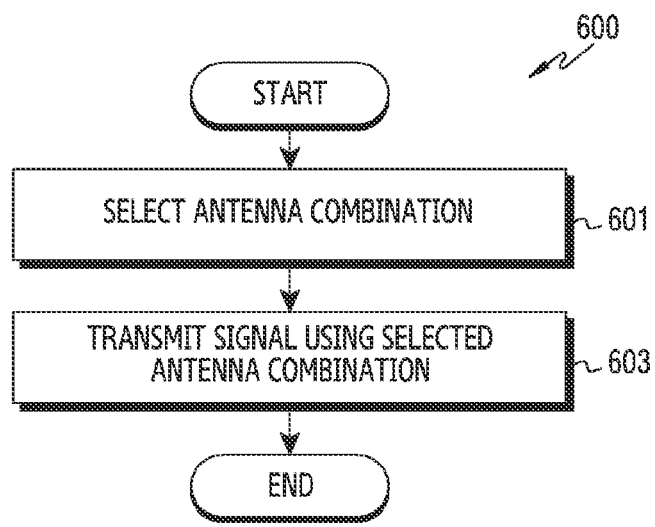
FIG. 6 is a flowchart illustrating an example method for allocating an antenna for each of a plurality of frequency bands in an electronic device according to various embodiments.

FIG. 6 is a flowchart 600 illustrating an example method for allocating an antenna for each of a plurality of frequency bands in the electronic device 101 according to various embodiments.

Referring to FIG. 6, in operation 601, when simultaneous signal transmission in different frequency bands through at least two antennas is required, the electronic device 101 may select an antenna combination. According to an embodiment, when at least two or more frequency bands to simultaneously transmit signals are determined, the electronic device 101 may select an antenna combination arranged to satisfy regulation required for a radiation energy concentration region based on the determined at least two or more frequency bands. The antenna combination may be defined as a set of one or a plurality of antennas to transmit a signal in each of two or more different frequency bands. The antenna combination may be determined based on the arrangement of antennas on a PCB.

According to an embodiment, a selection of an antenna combination may utilize a look-up table. The look-up table may be provided by, for example, combinations of antennas arranged to satisfy regulation required for a radiation energy concentration region corresponding to each of combinations of all supportable frequency bands. The look-up table, for example, may include combinations of antennas supporting different frequency bands in which the radiation energy concentration region is not to be provided even if signals are simultaneously transmitted, based on a distance between antennas disposed on the PCB, in particular, a separated distance between antennas supporting different frequency bands. The look-up table may be stored in, for example, a memory of the electronic device 101.

According to an embodiment, when at least two or more frequency bands to simultaneously transmit signals are determined, the electronic device 101 may select one of one or a plurality of antenna combinations registered to the look-up table correspondingly to the determined at least two or more frequency bands.

For example, when the electronic device 101 may support different first, second, and third frequency bands, the look-up table may include one or a plurality of antenna combinations that may be selected corresponding to each of a combination of the first and second frequency bands, a combination of the first and third frequency bands, a combination of the second and third frequency bands, and a combination of the first, second, and third frequency bands. In this case, the antenna combination may include at least one first antenna to support the first frequency band, at least one second antenna to support the second frequency band, and at least one third antenna to support the second frequency band.

According to an embodiment, the electronic device 101 may acquire one or a plurality of available antenna combinations correspondingly to a combination of frequency bands to simultaneously transmit signals from the look-up table. When the plurality of antenna combinations are acquired, the electronic device 101 may select one antenna combination that best satisfies regulation required for the radiation energy concentration region among the acquired plurality of antenna combinations.

According to an embodiment, when the plurality of available antenna combinations are acquired from the look-up table, the electronic device 101 may select one antenna combination having a highest priority order among the acquired plurality of antenna combinations. The priority order may be previously assigned to each of the antenna combinations registered to the look-up table. The priority order may be assigned to each antenna combination registered correspondingly to a combination of frequency bands. The priority order may be given based on the arrangement of antennas belonging to the antenna combination, for example. The priority order, for example, may be given according to order in which the arranged separated distance is greatest among the antenna combinations.

According to an embodiment, in operation 603, the electronic device 101 may transmit signals in at least two or more frequency bands using at least two or more antennas belonging to the selected antenna combination. The at least two or more frequency bands correspond to frequency bands which are considered when the antenna combination is selected. For example, when an antenna combination of first and second antennas is selected in response to a combination of the first and second frequency bands, the electronic device 101 may transmit a signal in the first frequency band through the first antenna, and may transmit a signal in the second frequency band through the second antenna.

Figure 7:
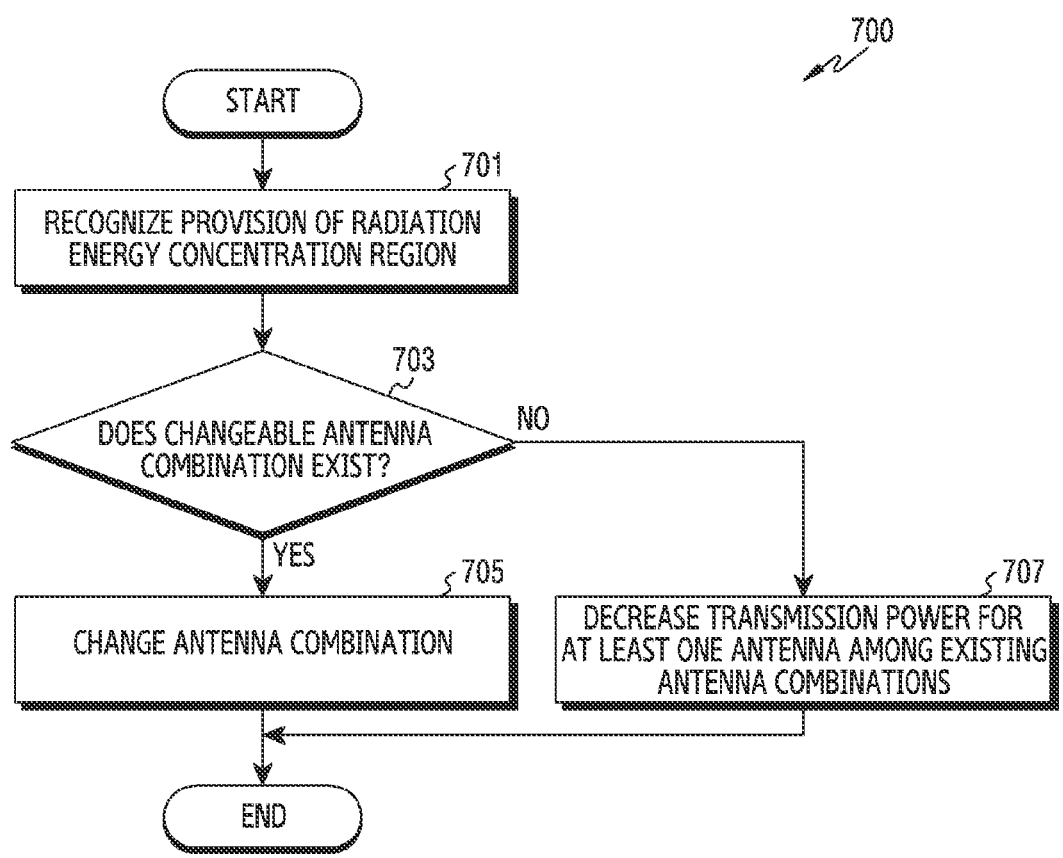
FIG. 7 is a flowchart illustrating an example method of operating an antenna to support for each frequency band in an electronic device according to various embodiments.

FIG. 7 is a flowchart 700 illustrating an example method for allocating an antenna for each of a plurality of frequency bands in the electronic device 101 according to various embodiments.

Referring to FIG. 7, in operation 701 of an embodiment, the electronic device 101 may recognize whether a radiation energy concentration region caused by an existing antenna combination is provided or is expected to be provided. For example, when even one antenna pair among antenna pairs included in the existing antenna combination is disposed closer than a threshold distance, the electronic device may determine that the radiation energy concentration region may be provided. The antenna pair may be a set of at least two antennas to be used to transmit signals of different frequency bands.

The electronic device 101, for example, may predict whether the radiation energy concentration region will be provided, based on the arrangement of one or a plurality of first antennas for radio access technology 1 (RAT1) transmitting a signal of a first frequency band and one or a plurality of second antennas for RAT2 transmitting a signal of a second frequency band. In an embodiment, according to the arrangement of the antennas shown in FIG. 4, when the signal of the first frequency band is transmitted using the FR1 #2 (313) as the RAT1 antenna and the signal of the second frequency band is simultaneously transmitted using the FR2 #1 (321) as the RAT2 antenna, it may be predicted that the radiation energy concentration region will be provided. The reason is that, in FIG. 4, the FR1 #2 (313) and the FR2 #1 (321) are disposed closer than a distance at which the provision of the radiation energy concentration region is predicted.

According to an embodiment, information on a separated distance based on arranged positions of all antennas or some antennas included in the electronic device may be managed through the look-up table. In this case, the electronic device 101 may recognize whether the radiation energy concentration region is provided or is expected to be provided in the existing antenna combination based on the distance information managed in the look-up table.

According to an embodiment, the electronic device 101 may predefine a set of antennas in which the radiation energy concentration region may be provided, based on the arrangement of the plurality of antennas, that is, the separated distance between the plurality of antennas. This may be prepared based on the results of experiments. The look-up table may manage a set of antennas in which the radiation energy concentration region is provided or is predicted to be provided and/or a set of antennas in which the radiation energy concentration region is not provided or is predicted not to be provided. One or a plurality of antenna sets managed by the look-up table may be predetermined based on a received signal strength difference between antennas of a corresponding antenna set or a separated distance between the antennas. In this case, the electronic device 101 may recognize whether the radiation energy concentration region caused by two or more antennas included in the existing antenna set is provided or is predicted to be provided, based on the information managed by the look-up table.

According to an embodiment, in operation 703, when the provision of the radiation energy concentration region is predicted or recognized, the electronic device 101 may determine whether there is an antenna combination (hereinafter, referred to as a 'new antenna combination') changeable to address the provision of the radiation energy concentration region. The new antenna combination may be determined by replacing at least one antenna among a plurality of antennas belonging to the existing antenna combination with available another antenna. Whether there is the new antenna combination may be determined, for example, by whether there is an antenna to replace a first antenna and/or a second antenna among available one or a plurality of antennas when the existing antenna combination includes the first and second antennas and the provision of the radiation energy concentration region is predicted or is recognized. For example, according to the arrangement of the antennas illustrated as an embodiment in FIG. 4, the electronic device 101 may determine whether there is the changeable antenna combination by whether the RAT1 antenna may change from the FR1 #2 (313) to the FR1 #4 (317) or whether the RAT2 antenna may change from the FR2 #1 (321) to the FR2 #4 (327).

According to various embodiments, when it is determined that the changeable new antenna combination exists (703—Yes), in operation 705, the electronic device 101 may change the existing antenna combination by the new antenna combination. The electronic device 101 may, for example, change the existing RAT1 antenna by a new antenna, to transmit the signal of the first frequency band. For example, in an embodiment of FIG. 4, when it is determined that the FR1 #4 (317) may be used, the electronic device 101 may change and transmit the first frequency band signal using the FR1 #4 (317) being the new antenna instead of the FR1 #2 (313) being the existing antenna. Accordingly, the electronic device 101 may decrease a SAR, maximum permissible exposure (MPE), or TER value at a measurement position during simultaneous transmission.

According to various embodiments, when it is determined that the changeable new antenna combination does not exist (703—No), in operation 707, the electronic device 101 may decrease a transmission power for at least one antenna among a plurality of antennas belonging to the existing antenna combination. For example, the electronic device 101 may decrease a transmission power of one of RAT1 and RAT2 belonging to the existing antenna combination. According to an embodiment, the electronic device 101 may decrease a transmission duty cycle instead of decreasing the transmission power. Here, the duty cycle may represent a ratio of a time transmitting a signal to a total time. Even by this, the electronic device 101 may decrease a SAR, MPE, or TER value at a measurement position during simultaneous transmission.

According to an embodiment, when the first frequency band is a frequency band of 6 GHz or less, the second frequency band is a frequency band of 6 GHz or more, and beamforming is used, it may be easier to change an antenna for the first frequency band than to change an antenna for the second frequency band. Since the second frequency band antenna radiates a signal just only in one direction using beamforming, when the second frequency band antenna is changed, the radiation direction of the signal may be changed and thus disconnection may be made. Contrary to this, since the first frequency band antenna performs omni-direction radiation, the change of the antenna may not cause a big problem.

In the operation illustrated in FIG. 7, a description is made in which the RAT1 antenna that uses the first frequency band is moved, but it may also be possible that the RAT2 antenna that uses the second frequency band is moved. However, priority order may be given to moving the RAT1 antenna that uses the first frequency band. In an embodiment, when there is a transmission of a signal of an unlicensed band concurrently with a transmission of a signal of the second frequency band and/or the first frequency band, it may be preferable to change an antenna for the signal transmission of the unlicensed band.

According to various embodiments, when the electronic device 101 changes the antenna according to operation 705, there may be a decrease of radiation performance after change due to a difference of radiation performance between the antennas. Accordingly, a method for solving the radiation energy concentration region may be determined by comparing performance attenuation caused by the antenna change of operation 705 or performance attenuation caused by the transmission power decrease of operation 707 as well.

Figure 8:
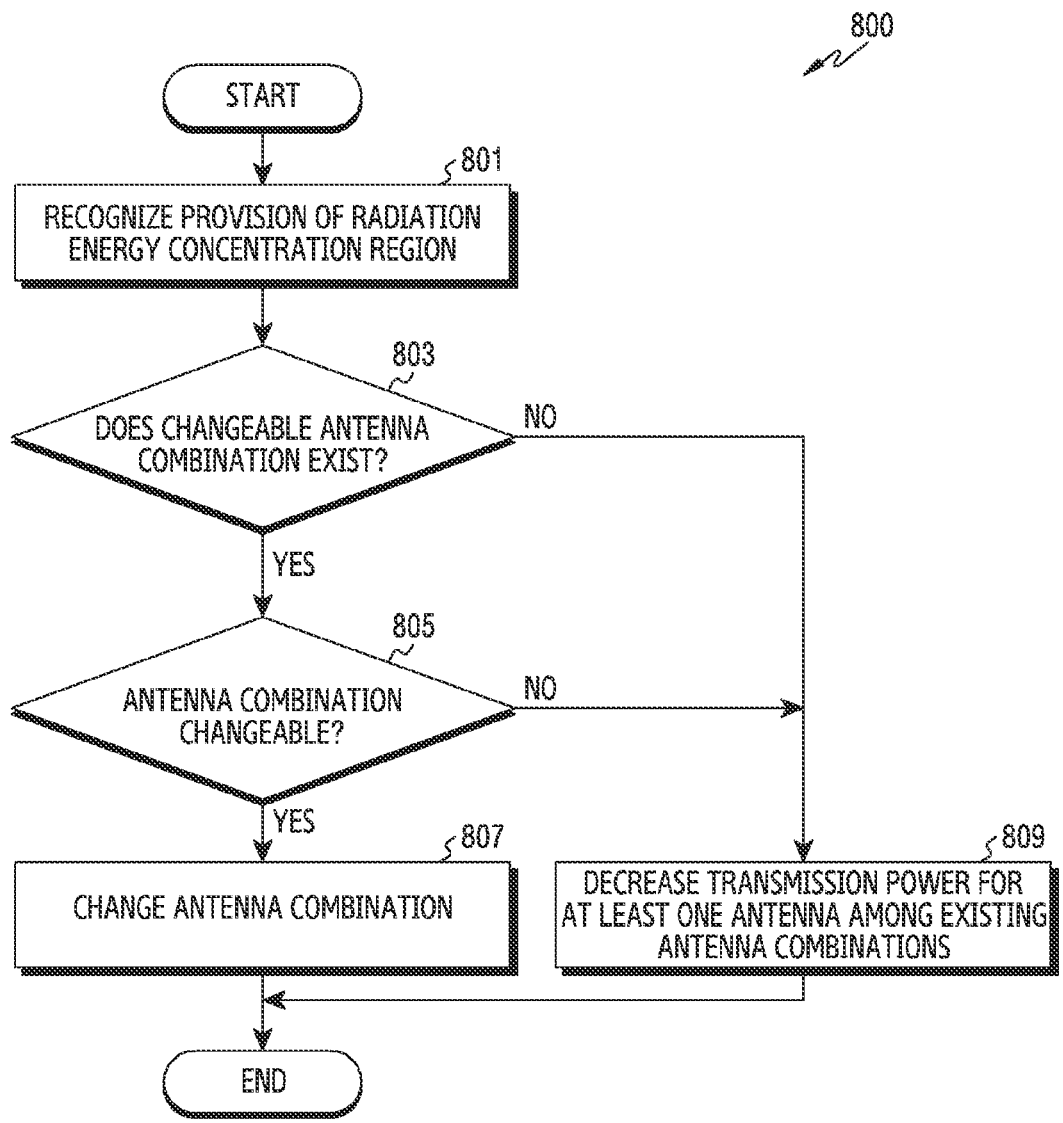
FIG. 8 is a flowchart illustrating an example method of operating an antenna to support for each frequency band in an electronic device according to various embodiments.

FIG. 8 is a flowchart 800 illustrating an example method of operating an antenna to support for each frequency band in the electronic device 101 according to various embodiments.

Referring to FIG. 8, when the provision of a radiation energy concentration region in the existing antenna combination is recognized or predicted, the electronic device 101 of an embodiment may determine whether a changeable new antenna combination exists (operation 801 and operation 803). Since the operations of the electronic device 101 in operation 801 and operation 803 are the same as or similar to the operations of the electronic device 101 in operations 701 and 703 of FIG. 7, a detailed description thereof may not be repeated here.

According to various embodiments, when it is determined that the changeable new antenna combination exists (803—Yes), in operation 805, the electronic device 101 may determine whether the antenna combination is changeable. According to an embodiment, the electronic device 101 may determine whether the antenna combination is changeable based on the comparison result of a difference between a received signal strength of the existing antenna and a received signal strength of a new antenna and a threshold value. For example, when the difference between the received signal strength of the existing antenna and the received signal strength of the new antenna is less than the threshold value, the electronic device 101 may determine that the antenna combination may be changed. The existing antenna may be, for example, an antenna included in the existing antenna combination, and the new antenna may be, for example, an antenna included in the new antenna combination.

In an embodiment, the difference of the received signal strength may be a difference between a received signal strength of a new antenna (e.g., FR1 #4 (317)) and a received signal strength of the existing antenna (e.g., FR1 #2 (312)). The received signal strength may be, for example, a reference signal received power (RSRP) corresponding to a strength of a received reference signal. In an embodiment, instead of the RSRP, other performance indicators (e.g., a signal-to-noise ratio (SNR), a received signal strength indicator (RSSI), a reference signal received quality (RSRQ), and/or a signal-to-interference-plus-noise ratio (SINR)) capable of presenting similar information may be used.

In an embodiment, in response to being less than the threshold value, it may refer, for example, to there not being a performance difference between the two antennas, and in response to being greater than the threshold value, it may refer, for example, to there being a performance difference between the two antennas. As an example, when a user is holding or blocking a new antenna intended to be changed, significant performance degradation or communication disconnection may be caused at antenna change.

According to various embodiments, when it is determined that the antenna combination is changeable (805—Yes), in operation 807, the electronic device 101 may change the existing antenna combination by a new antenna combination. Since the operation of the electronic device 101 in operation 807 is the same as that of the electronic device 101 in operation 705 of FIG. 7, a detailed description thereof will be omitted.

According to various embodiments, when it is determined that the antenna combination is not changeable (805—No), in operation 809, the electronic device 101 may decrease a transmission power for at least one antenna among a plurality of antennas belonging to the existing antenna combination. Since the operation of the electronic device 101 in operation 809 is the same as or similar to that of the electronic device 101 in operation 707 of FIG. 7, a detailed description thereof may not be repeated here.

The threshold value used in operation 805 of FIG. 8 may be determined based on the transmission power decreased in operation 809. As an embodiment, the threshold value may be set as a value equal to or less than a value corresponding to a performance decrease decreased by the transmission power decreased in operation 809.

Figure 9:
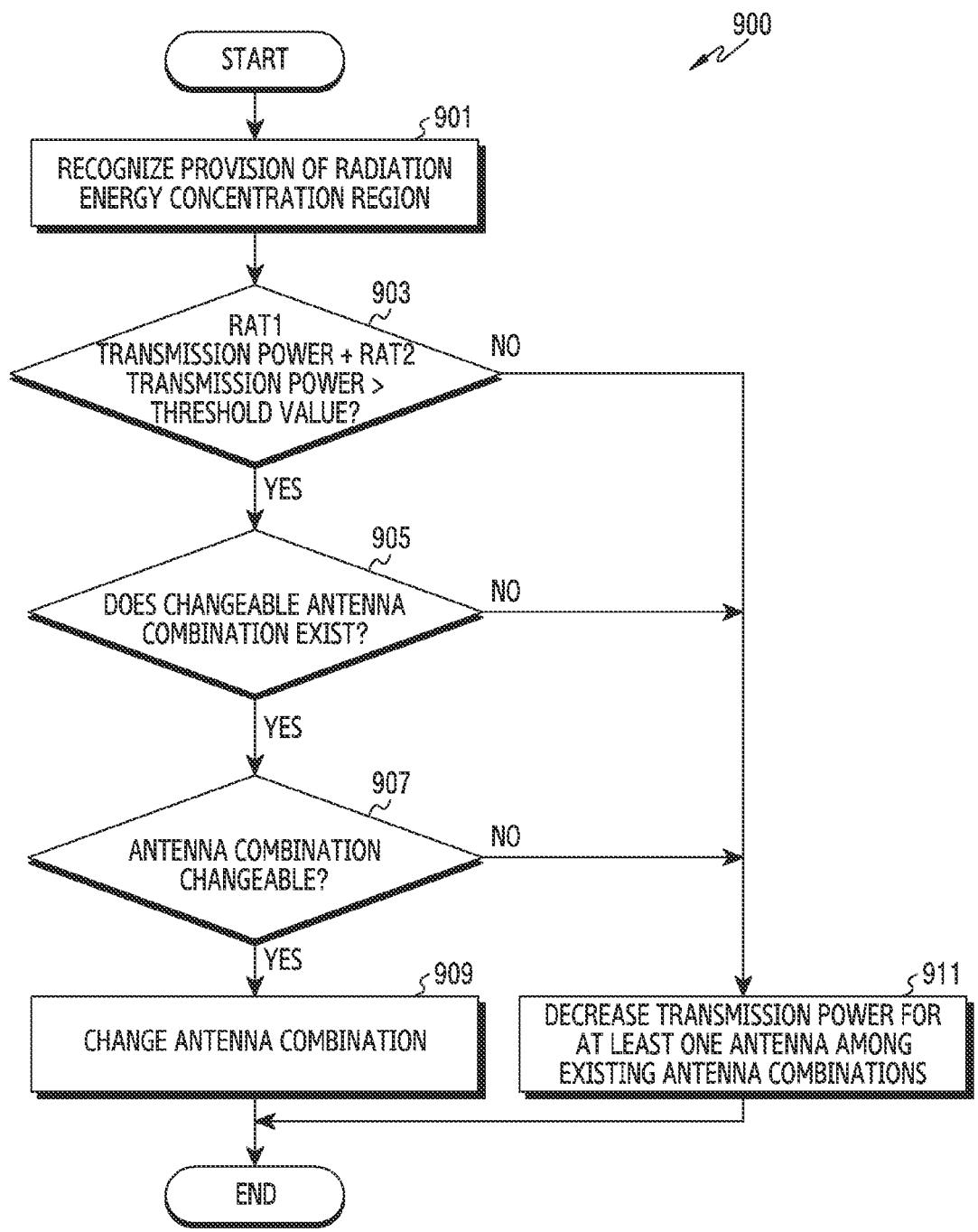
FIG. 9 is a flowchart illustrating an example method of operating an antenna to support for each frequency band in an electronic device according to various embodiments.

FIG. 9 is a flowchart 900 illustrating an example method of operating an antenna to support for each frequency band in the electronic device 101 according to various embodiments.

Referring to FIG. 9, when recognizing whether a radiation energy concentration region has been provided in operation 901, before determining whether a changeable new antenna combination exists in operation 905, the electronic device 101 may, in operation 903, determine whether a total transmission power of two or more antennas belonging to the existing antenna combination is greater than a threshold value. For example, the electronic device 101 may determine a sum of a transmission power of RAT1 and a transmission power of RAT2, and compare whether the determined sum of the transmission power is greater than the threshold value.

According to various embodiments, when it is determined that the total transmission power is greater than the threshold value (903—Yes) as the determination result of operation 903, the electronic device 101 may perform operations 905 to 911.

According to various embodiments, when it is determined that the total transmission power is not greater than the threshold value (903—No) as the determination result of operation 903, the electronic device 101 may perform operation 911.

Operations of the electronic device 101 in operation 905 to operation 911 are the same as or similar to those of the electronic device 101 in operation 803 to operation 809 of FIG. 8, and thus a detailed description thereof will be omitted.

In operation 707, operation 809, or operation 911, the electronic device 101 must select an RAT or antenna to decrease a transmission power. In this case, the electronic device 101 may consider a plurality of parameters. As an embodiment, a quality of service (QoS) required for a signal transmitted through each RAT or each antenna may be different. Based on this, the electronic device 101 may select requiring a lower QoS by the RAT or antenna for decreasing the transmission power. As an embodiment, the electronic device 101 may select the RAT or antenna, based on a delay sensitivity and accordingly, may select the RAT or antenna transmitting a delay-tolerant signal.

According to various embodiments, an mmWave antenna module may be used for purposes (e.g., a radar application, face recognition, object detection, gesture recognition) other than communication. In this case, to decrease the transmission power, the electronic device 101 may not select the mmWave module that is currently using the radar application. That is because this selection may deteriorate a quality of a user experience.

According to various embodiments, regarding an antenna sufficiently close to an antenna (e.g., the FR2 #1 (321) of FIG. 4) for a second frequency band among antennas for a first frequency band or an antenna (e.g., the FR1 #2 (313) of FIG. 4) within a preset threshold distance, when the electronic device 101 is transmitting a signal through the antenna (e.g., the FR2 #1 (321) of FIG. 4) for the second frequency band, the electronic device 101 may control not to transmit the signal. Inversely, regarding an antenna sufficiently close to an antenna (e.g., the FR1 #2 (313) of FIG.

4) for the first frequency band among antennas for the second frequency band or an antenna (e.g., the FR2 #1 (321) of FIG. 4) within a preset threshold distance, when the electronic device 101 is transmitting a signal through the antenna (e.g., the FR1 #2 (313) of FIG. 4) for the first frequency band, the electronic device 101 may control not to transmit the signal. In this case, priority order may be given in determining which antenna will transmit a signal. In an embodiment, when an antenna radiation pattern has directivity, it may be set to transmit first of all. In an embodiment, when a high QoS is required, when a licensed frequency band is used, or when a delay-sensitive signal is transmitted, it may be set to transmit first of all. The subject of the operation described earlier with reference to FIG. 6 to FIG. 9 may be understood as an electronic device (e.g., the electronic device 101 of FIG. 1) or a processor of the electronic device (e.g., the processor 120 of FIG. 1, the processor 120 of FIG. 2, or the second communication processor 214 of FIG. 2). Accordingly, in the operation description referring to FIG. 6 to FIG. 9, the subject is mentioned as the electronic device 101 but may be undoubtedly performed by at least one of the processor 120 of FIG. 1, the processor 120 of FIG. 2, or the second communication processor 214 of FIG. 2. As an embodiment, when considering that the operation in FIG. 6 to FIG. 9 is to selectively operate the antenna, it may be desirable that the second communication processor 214 illustrated in FIG. 2 performs the corresponding operation.

According to various example embodiments, an electronic device (e.g., the electronic device 101 of FIG. 1) may include: a plurality of first antennas (e.g., the FR1 311, 313, 315, and 317 of FIG. 3) configured to transmit a signal of a first frequency band, a plurality of second antennas (e.g., the FR2 321, 323, 325, and 327 of FIG. 3) configured to transmit a signal of a second frequency band, at least one processor (e.g., the processor 120 of FIG. 1), and a memory (e.g., the memory 130 of FIG. 1) operatively connected to the at least one processor and storing a look-up table including a plurality of antenna combinations. The memory may store instructions which, when executed, cause the at least one processor to: based on signal transmission in the first frequency band and the second frequency band being requested, select one antenna combination among the plurality of antenna combinations included in the look-up table based on the first frequency band and the second frequency band, and control the electronic device to transmit a signal of the first frequency band through a first selected antenna included in the selected antenna combination, and to transmit a signal of the second frequency band through a second selected antenna included in the selected antenna combination. The first selected antenna may be one of the plurality of first antennas, the second selected antenna may be one of the plurality of second antennas, and the plurality of antenna combinations may be combinations of a first antenna and a second antenna determined based on an arrangement of the plurality of first antennas and the plurality of second antennas in the electronic device.

According to various example embodiments, the instructions may, when executed, cause the at least one processor to: based on the one antenna combination to be selected based on the first frequency band and the second frequency band among the plurality of antenna combinations included in the look-up table not existing, decrease at least one of a transmission power of a first antenna included in a current antenna combination and a transmission power of a second antenna included in the current antenna combination, and determine an antenna to decrease a transmission power, based on at least one of a quality of service (QoS) or delay-tolerance required by a signal of each frequency band.

According to various example embodiments, the instructions, when executed, may cause the at least one processor to: based on the one antenna combination to be selected based on the first frequency band and the second frequency band among the plurality of antenna combinations included in the look-up table not existing, decrease at least one of a duty cycle of signal transmission in the first frequency band through the first antenna included in the current antenna combination and a duty cycle of signal transmission in the second frequency band through the second antenna included in the current antenna combination.

According to various example embodiments, the instructions, when executed, may cause the processor to: based on a difference of transmission performance of the first antenna included in the current antenna combination and transmission performance of the first selected antenna included in the selected antenna combination being less than a threshold value, use the first selected antenna included in the selected antenna combination instead of the first antenna included in the current antenna combination.

According to various example embodiments, the instructions, when executed, may cause the at least one processor to: based on antenna combinations being selected among the plurality of antenna combinations included in the look-up table, select one antenna combination based on a priority order of the selected plurality of antenna combinations, and the priority order may be based on a separated degree of positions in which the first antenna and the second antenna included in the antenna combination are disposed in the electronic device.

According to various example embodiments, an electronic device (e.g., the electronic device 101 of FIG. 1) may include: at least one memory (e.g., the memory 130 of FIG. 1), one or a plurality of first antennas (e.g., the FR1 311, 313, 315, and 317 of FIG. 3) configured to transmit a signal of a first frequency band, a plurality of second antennas (e.g., the FR2 321, 323, 325, and 327 of FIG. 3) configured to transmit a signal of a second frequency band, and at least one processor (e.g., the processor 120 of FIG. 1) operably coupled to the at least one memory and configured to: control the one or plurality of first antennas and the plurality of second antennas. The at least one memory may store instructions which, when executed, cause the at least one processor to: select a new antenna combination to replace a current antenna combination from a look-up table including antenna combinations determined based on a radiation energy concentration region which may be provided by a radiation region of a signal transmitted in the first frequency band and a radiation region of a signal transmitted in the second frequency band. A first antenna included in the current antenna combination and a first antenna included in the new antenna combination may be the same, and a second antenna included in the current antenna combination and a second antenna included in the new antenna combination may be different.

According to various example embodiments, the at least one memory may store the look-up table, and the antenna combinations included in the look-up table may be determined based on positions in which the one or plurality of first antennas and the one or plurality of second antennas are disposed in the electronic device.

According to various example embodiments, a method of operating an electronic device may include: determining whether signal transmission in a first frequency band through a first selected antenna selected from a plurality of first antennas configured to transmit a signal of the first frequency band and signal transmission in a second frequency band through a second selected antenna selected from a plurality of second antennas configured to transmit a signal of the second frequency band are to be performed simultaneously, and based on the signal transmission in the first frequency band and the signal transmission in the second frequency band being performed simultaneously, determining at least one of the first selected antenna or the second selected antenna using a look-up table created based on the arrangement of the plurality of first antennas and the plurality of second antennas in the electronic device, and transmitting the signal of the first frequency band through the first selected antenna, and transmitting the signal of the second frequency band through the second selected antenna.

According to various example embodiments, the method may further include, based on a change of the first selected antenna and the second selected antenna being requested, changing at least one of the second selected antenna or the second selected antenna by another antenna using the look-up table.

According to various example embodiments, the method may further include, based on there not being another antenna to change at least one of the first selected antenna or the second selected antenna using the look-up table, decreasing at least one of a transmission power of the first selected antenna or a transmission power of the second selected antenna.

According to various example embodiments, the method may further include, based on there not being another antenna to change at least one of the first selected antenna or the second selected antenna using the look-up table, decreasing at least one of a duty cycle of signal transmission in the first frequency band through the first selected antenna and a duty cycle of signal transmission in the second frequency band through the second selected antenna.

According to various example embodiments, the method may further include, based on a plurality of first antennas or a plurality of second antennas being selected using the look-up table, selecting one of the plurality of first antennas as the first selected antenna or selecting one of the plurality of second antennas as the second selected antenna, based on priority order, and the priority order may be based on a separation degree of positions in which the first antenna and the second antenna are disposed in the electronic device.

According to various example embodiments, decreasing at least one of the transmission power of the first selected antenna and the transmission power of the second selected antenna may include determining an antenna to decrease a transmission power, based on at least one of a quality of service (QoS) or delay-tolerance required by a signal of each frequency band.

According to various example embodiments, a method of operating an electronic device may include: selecting a new antenna combination to replace a current antenna combination from a look-up table including antenna combinations determined based on a radiation energy concentration region provided by a radiation region of a signal transmitted in the first frequency band and a radiation region of a signal transmitted in the second frequency band, transmitting the signal of the first frequency band through at least one first antenna included in the selected new antenna combination, and transmitting the signal of the second frequency band through at least one second antenna included in the selected new antenna combination. A first antenna included in the current antenna combination and a first antenna included in the new antenna combination may be the same, and a second antenna included in the current antenna combination and a second antenna included in the new antenna combination may be different.

According to various example embodiments, the antenna combinations included in the look-up table may be based on positions in which the one or plurality of first antennas and the one or plurality of second antennas are disposed in the electronic device.

The transmission antenna selection method of the above-described various example embodiments may remove in advance a possibility that the electronic device violates a radio protocol of a regulatory authority.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a plurality of antennas including a plurality of first antennas for a first frequency band, and a plurality of second antennas for a second frequency band;
at least one sensor configured for detecting a position of a user grip for the electronic device;
at least one processor comprising processing circuitry; and
memory storing instructions that, when executed by the at least one processor individually or collectively, cause the electronic device to:
identify that a transmission of first signals of the first frequency band and a transmission of second signals of the second frequency band are requested,
in case that an antenna combination for the first frequency band and the second frequency band exists among a plurality of antenna combinations,
transmit the first signals of the first frequency band through a first antenna of the antenna combination, and the second signals of the second frequency band through a second antenna of the antenna combination,
in case that the antenna combination does not exist among the plurality of antenna combinations:
decrease at least one of a first duty cycle for the first signals or a second duty cycle for the second signals, and
perform a beam search for transmitting the first signals and the second signals with at least one of the decreased first duty cycle or the decreased second duty cycle by using antennas determined based on the position of the user grip among the plurality of antennas,
wherein the first antenna is included in the plurality of first antennas, and the second antenna is included in the plurality of second antennas, and
wherein information on the plurality of antenna combinations for reducing interference between a plurality of frequency bands is stored in the memory.

2. The electronic device of claim 1, wherein the antennas determined based on the position of the user grip include a third antenna and a fourth antenna, and
wherein the third antenna among the plurality of first antennas and the fourth antenna among the plurality of second antennas are determined further based on at least one of a quality of service (QoS) or delay-tolerance required by a signal of each frequency band.

3. The electronic device of claim 1, wherein, in case that multiple antenna combinations are identified among the plurality of antenna combinations, the antenna combination is identified based on priority orders of the multiple antenna combinations, and
wherein the priority orders are based on a separation degree of positions of antennas included in each of the multiple antenna combinations.

4. The electronic device of claim 1, wherein the instructions, when executed by the at least one processor individually or collectively, cause the electronic device to:
compare a signal strength of the first antenna and a signal strength of a third antenna among the plurality of first antennas, and
in case that the signal strength of the first antenna is lower than the signal strength of the third antenna, change an antenna for the first signals from the first antenna to the third antenna.

5. The electronic device of claim 4, wherein the instructions, when executed by the at least one processor individually or collectively, cause the electronic device to:
change the antenna combination to include the third antenna for the first frequency band and the second antenna for the second frequency band.

6. The electronic device of claim 1, wherein the plurality of antenna combinations are included in a look up table, and
wherein the look up table is stored in the memory.

7. A method performed by an electronic device, the method comprising:
identifying that a transmission of first signals of a first frequency band and a transmission of second signals of a second frequency band are requested;

in case that an antenna combination for the first frequency band and the second frequency band exists among a plurality of antenna combinations, transmitting the first signals of the first frequency band through a first antenna of the antenna combination, and the second signals of the second frequency band through a second antenna of the antenna combination; and in case that the antenna combination does not exist among the plurality of antenna combinations:

decreasing at least one of a first duty cycle for the first signals or a second duty cycle for the second signals; and performing a beam search for transmitting the first signals and the second signals with at least one of the decreased first duty cycle or the decreased second duty cycle by using antennas determined based on a position of a user grip among a plurality of antennas including a plurality of first antennas for the first frequency band and a plurality of second antennas for the second frequency band, wherein the position of the user grip is identified using an at least one sensor of the electronic device, wherein the first antenna is included in the plurality of first antennas, and the second antenna is included in the plurality of second antennas, and wherein information on the plurality of antenna combinations for reducing interference between a plurality of frequency bands is stored in memory of the electronic device.

8. The method of claim 7, further comprising:
in case that a change of the first antenna and the second antenna are requested, changing at least one of the first antenna or the second antenna based on the plurality of antenna combinations.

9. The method of claim 7, wherein, in case that multiple antenna combinations are identified among the plurality of antenna combinations, the antenna combination is identified based on priority orders of the multiple antenna combinations, and wherein the priority orders are based on a separation degree of positions of antennas included in each of the multiple antenna combinations.

10. The method of claim 7, wherein the antennas determined based on the position of the user grip includes a third antenna and a fourth antenna, and wherein the third antenna among the plurality of first antennas and the fourth antenna among the plurality of second antennas are determined further based on at least one of a quality of service (QoS) or delay-tolerance required by a signal of each frequency band.

11. The method of claim 7, further comprising:
comparing a signal strength of the first antenna and a signal strength of a third antenna among the plurality of first antennas; and in case that the signal strength of the first antenna is lower than the signal strength of the third antenna, changing an antenna for the first signals from the first antenna to the third antenna.

12. The method of claim 11, further comprising:
changing the antenna combination to include the third antenna for the first frequency band and the second antenna for the second frequency band.

13. The method of claim 7, wherein the plurality of antenna combinations are included in a look up table, and wherein the look up table is stored in the memory.

* * * * *